United States Patent
Boudreau et al.

(10) Patent No.: US 9,146,711 B1
(45) Date of Patent: Sep. 29, 2015

(54) SOFTWARE COMPONENT CONFIGURATION IDENTIFICATION

(71) Applicant: INTERNATIONAL BUSINESS MACHINES CORPORATION, Armonk, NY (US)

(72) Inventors: Michael K. Boudreau, Orange, CA (US); Jamie B. Marsnik, Annandale, MN (US); Bradley T. Moore, Dana Point, CA (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/470,049

(22) Filed: Aug. 27, 2014

(51) Int. Cl.
G06F 9/44 (2006.01)
(52) U.S. Cl.
CPC ............................. *G06F 8/24* (2013.01)
(58) Field of Classification Search
CPC ............................................ G06F 8/24
USPC .................................. 717/106–167
See application file for complete search history.

(56) References Cited

U.S. PATENT DOCUMENTS

| | | | |
|---|---|---|---|
| 6,446,061 B1 * | 9/2002 | Doerre et al. | 707/738 |
| 6,539,348 B1 * | 3/2003 | Bond et al. | 704/9 |
| 7,606,782 B2 * | 10/2009 | Haley | 706/50 |
| 8,108,315 B2 | 1/2012 | Krawetz | |
| 8,533,704 B2 * | 9/2013 | Wookey | 717/174 |
| 8,752,000 B2 * | 6/2014 | Granholm et al. | 717/101 |
| 2004/0122656 A1 * | 6/2004 | Abir | 704/4 |
| 2007/0265832 A1 * | 11/2007 | Bauman et al. | 704/10 |
| 2007/0271190 A1 * | 11/2007 | Foster | 705/59 |
| 2009/0007094 A1 | 1/2009 | Hinton et al. | |
| 2009/0007097 A1 | 1/2009 | Hinton et al. | |
| 2011/0131134 A1 | 6/2011 | Ferris et al. | |
| 2013/0055231 A1 * | 2/2013 | Hyndman et al. | 717/169 |
| 2013/0204877 A1 * | 8/2013 | Boyle et al. | 707/739 |

FOREIGN PATENT DOCUMENTS

WO 2013019689 2/2013

OTHER PUBLICATIONS

Loper, Edward, and Steven Bird. "NLTK: The natural language toolkit." Proceedings of the ACL-02 Workshop on Effective tools and methodologies for teaching natural language processing and computational linguistics—vol. 1. Association for Computational Linguistics, 2002, pp. 63-70.*

Collobert, Ronan, et al. "Natural language processing (almost) from scratch." The Journal of Machine Learning Research 12 (2011), pp. 2493-2537.*

(Continued)

*Primary Examiner* — Satish Rampuria
(74) *Attorney, Agent, or Firm* — Schmeiser, Olsen & Watts; Matthew Chung (57) ABSTRACT

An identification method is provided. The method includes generating dictionaries comprising a product taxonomy and associated base entities comprising sub-sets within a plurality of software products. Data entities are located from unstructured text of the dictionaries. Locating the data entities includes locating long distance word matches within the unstructured text. Ontologies are populated with the entities and relationships between the data entities are determined.

18 Claims, 7 Drawing Sheets

(56) References Cited

OTHER PUBLICATIONS

Ogren, Philip V., Philipp G. Wetzler, and Steven Bethard. "ClearTK: A UIMA toolkit for statistical natural language processing." Towards Enhanced Interoperability for Large HLT Systems: (2008), pp. 32-38.*

Anonymous; Method, apparatus, and system to uniquely identify and operate over the components and functions of an operating system; ip.com; IP.com No. IPCOM000198338D; Aug. 5, 2010; 5 pages.
McDermott, John; R1: A Rule-Based Configurer of Computer Systems; ip.com; IP.com No. IPCOM000138081D; Original Publication Date: Apr. 30, 1980; IP.com Electronic Publication: Mar. 28, 2007; 55 pages.

* cited by examiner

Product Page

| Asset Home |
| Sherlock Home |
| Product Home |

Product Documentation for:
Manuf: A
Contract: SPLA

[Manufacturer] [Contract] [Product] [Product Family] [Assignment]
Main   Name Hitory and Versions   Editions   Ta and Cs

| Manufacturer | Component | Version | Base |
|---|---|---|---|
| A | Onde Relational Database Management System | 10.0 | Yes |
| A | Onde Pad Safe | 1.2 | No |
| A | Onde Data Guard | 2.1 | No |
| A | Roling Upgrades | 2.2 | No |
| A | Online Index Rebuild | 1.2 | No |
| A | Online Table ReRedefinition | 1.2 | No |
| A | Doubled Backup Sets | 1.1 | No |
| A | Lost Write Protection | 4.2 | No |
| A | Fastback Table | 2.2 | No |
| A | Fastback Databack | 2.2 | No |
| A | Fastback Tranaction | 2.2 | No |
| A | Fastback Transaction Recovery | 2.2 | No |
| A | Onde Client | 3.1 | No |
| A | Query Results Cache | 1.1 | No |
| A | Automatic Workload Management | 1.1 | No |
| A | Block-Level Media Recovery | 1.2 | No |
| A | Change Aware Incremental Backups | 1.3 | No |

Source

Comments

FIG. 3A

Product Page

Family: A Sql Server  Version: 10.0
Product: A Sql Server Enterprise Edition  Licensing Model: Hostname/Cal

| Entiteled Components | | Concluded Components | Instalation | Discovery | |
|---|---|---|---|---|---|
| Exit-Run | Optional | Same Syst. | Client Side | Source | Page |
| Yes | No | n/a | No | L10R.doc | 3 |
| No | Yes | Yes | No | L10R.doc | 3 |
| No | Yes | Yes | No | L10R.doc | 4 |
| No | Yes | Yes | No | L10R.doc | 4 |
| No | Yes | Yes | No | L10R.doc | 4 |
| No | Yes | Yes | No | L10R.doc | 3 |
| No | Yes | Yes | No | L10R.doc | 3 |
| No | Yes | Yes | No | L10R.doc | 3 |
| No | Yes | Yes | No | L10R.doc | 3 |
| No | Yes | Yes | No | L10R.doc | 0 |
| No | Yes | Yes | No | L10R.doc | 2 |
| No | Yes | Yes | No | L10R.doc | 3 |
| No | Yes | No | Yes | L10R.doc | 5 |
| No | Yes | Yes | No | L10R.doc | 5 |
| No | Yes | Yes | No | L10R.doc | 5 |
| No | Yes | Yes | No | L10R.doc | 5 |
| No | Yes | Yes | No | L10R.doc | 6 |

SOFTWARE COMPONENT CONFIGURATION IDENTIFICATION

FIELD

The present invention relates generally to a method for automatically identifying software component configuration, and in particular to a method and associated system for using natural language processing to identify software component configuration options with respect to software installation manuals.

BACKGROUND

Installing computer software typically includes an inaccurate process with little flexibility. Configuring computer software may include a complicated process that may be time consuming and require a large amount of resources. Accordingly, there exists a need in the art to overcome at least some of the deficiencies and limitations described herein above.

SUMMARY

A first aspect of the invention provides a method comprising: generating, by a computer processor of a computing system, dictionaries comprising a product taxonomy and associated base entities comprising sub-sets within said plurality of software products; locating, by the computer processor, data entities from unstructured text of said dictionaries, wherein the locating the data entities comprises locating long distance word matches within the unstructured text; populating, by the computer processor executing a parser component, ontologies with the data entities; and determining, by the computer processor executing the parser component, relationships between the data entities.

A second aspect of the invention provides a computing system comprising a computer processor coupled to a computer-readable memory unit, the memory unit comprising instructions that when executed by the computer processor implements a method comprising: generating, by the computer processor, dictionaries comprising a product taxonomy and associated base entities comprising sub-sets within the plurality of software products; locating, by the computer processor, data entities from unstructured text of the dictionaries, wherein said locating said data entities comprises locating long distance word matches within said unstructured text; populating, by said computer processor executing a parser component, ontologies with said data entities; and determining, by said computer processor executing said parser component, relationships between said data entities.

A third aspect of the invention provides a computer program product for configuration identification, the computer program product comprising: one or more computer-readable, tangible storage devices; program instructions, stored on at least one of the one or more storage devices, to generate dictionaries comprising a product taxonomy and associated base entities comprising sub-sets within said plurality of software products; program instructions, stored on at least one of the one or more storage devices, to locate data entities from unstructured text of the dictionaries, wherein the locating the data entities comprises locating long distance word matches within the unstructured text; program instructions, stored on at least one of the one or more storage devices, to populate, by a computer processor executing a parser component, ontologies with the data entities; and program instructions, stored on at least one of the one or more storage devices, to determine relationships between the data entities.

The present invention advantageously provides a simple method and associated system capable of installing computer software.

BRIEF DESCRIPTION OF THE DRAWINGS

FIG. 2, including FIGS. 3A and 3B, illustrates a screen shot representing relationships in the triple store schema of FIG. 2, in accordance with embodiments of the present invention.

DETAILED DESCRIPTION

Figure 1:
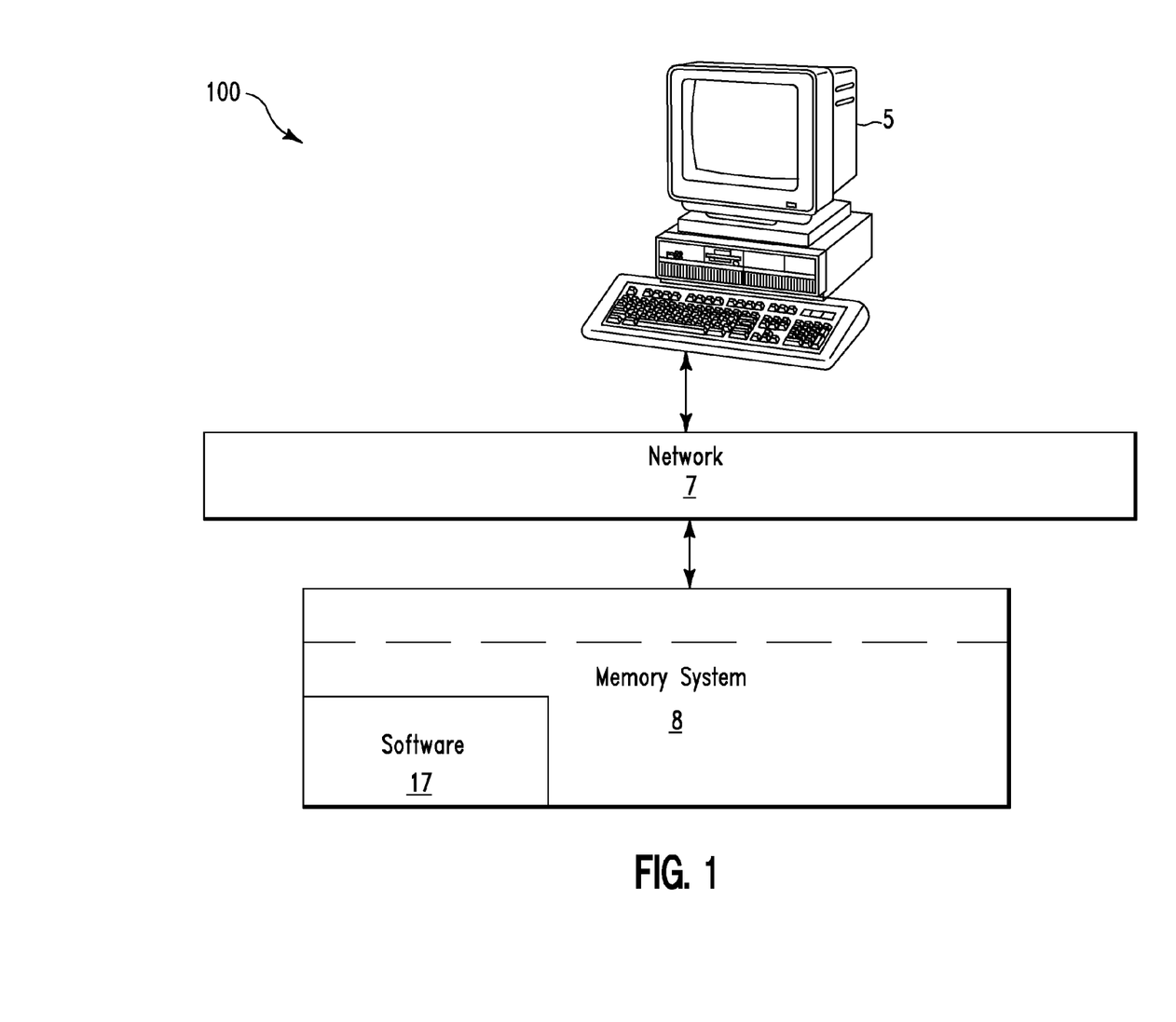
FIG. 1 illustrates a system for using natural language processing (NLP) to identify software component configuration options with respect to software installation manuals, in accordance with embodiments of the present invention.

FIG. 1 illustrates a system 100 for using natural language processing (NLP) to identify software component configuration options with respect to software installation manuals, in accordance with embodiments of the present invention. The above and other features of the present invention will become more distinct by a detailed description of embodiments shown in combination with attached drawings. Identical reference numbers represent the same or similar parts in the attached drawings of the invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

System 100 executes a process for identifying software component configuration options and prerequisites based on a set of interrelated software installation manuals and/or license agreements. System 100 determines (based on performing a parsing process with respect to installation manuals and/or software licenses) entitled, required, and/or optional software components for installation on computing devices. The parsing process may be implemented as a natural language processing (NLP) process with respect to the installation manuals and/or software licenses. The installation manuals and/or software license documents comprise unstructured data and resulting parsed documents are used to determine:
1. Authorized installation topologies (e.g., a location for software residing within a network deployment.
2. Additionally required, entitled, and/or optional software components.
3. Previously unknown installation configurations authorized by the installation manuals and/or software licenses.

System 100 of FIG. 1 includes a devices 5 connected through a network 7 to a computing system 14. Network 7 may include any type of network including, inter alia, a local area network, (LAN), a wide area network (WAN), the Internet, a wireless network, etc. Device 5 may include any type of computing device or system including, inter alia, a computer (PC), a laptop computer, a tablet computer, a server, a PDA, a smart phone, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes software 17.

System 100 enables a process for executing natural language processing (NLP) with respect to software license agreements in order to determine authorized software components (of a software application) for installation on a computing device. Software manufacturers typically sell software licensing agreements with respect to software products (i.e., not individual software components). A software licensing agreement is defined herein as a document describing software components authorized for installation and associated adherence conditions to be satisfied in order to remain compliant with the software licensing agreement. In order to determine compliance with the software licensing agreement, system 100 identifies components that the agreement entitles to be installed and require reconciliation. Additionally, system 100 determines software components that are optional to install vs software components that will always be installed (e.g., base components).

System 100 evaluates software component (unstructured data based) installation manuals and/or licensing agreements (with respect to a software application) and determines:
1. Entitled software components for installation.
2. Prerequisites required for execution of software components.
3. Optional software components for installation.
4. Base software components.
5. Necessary and unnecessary software components required for execution of the software application.

System 100 enables a process with respect to a NLP process driven by ontology models to analyze the unstructured data (within the installation manuals and/or licensing agreements) as follows:

Loading all product taxonomy information (PTI) into a triple store thereby allowing product recognition within the unstructured data. A triple store is defined herein as a purpose built database used for the storage and retrieval of triples. A triple is defined herein as a data entity comprising a subject-predicate-object. System 100 generates an ontology from the PTI data thereby allowing a matching process with respect to a variety of formations. For example, tracking licenses for a software application "Rational software architect for web 8.0.3" may not retrieve the exact terminology. Potential variations for the terminology may comprise:
1. RSA for web 803
2. RSA for W v8r3
3. Rational software architect for web version 8 release 3.

Based on the PTI, an ontology may be generated and populated from structured data sources in such a way that will drive a runtime NLP recognition of:
1. Direct (terminology) matches.
2. Partial (terminology) matches.
3. Long distance (terminology) matches.

The triple store is generated by scanning the license agreements, extracting associated entities from the license agreements, and evaluating the license agreement s for associated relationships. The associated relationships specify authorized entitlements. The associated relationships may comprise:
1. Prerequisite software components required for execution.
2. Optional software components.
3. Foundational (base) software components. A base component is defined herein as a component that when not present on a system, associated software applications will be unable execute (i.e., associated software applications are unable to run without an associated base component). Therefore, when a necessary base component is missing associated software is deemed non-functional and therefore is not installed on the system.
4. Unnecessary software components.
5. Necessary software components required for execution.

System 100 processes software license documents, retrieves known terms, and stores the processed data in an ontology. Objects in the ontology may include, inter alia, a vendor license, a product component, etc. Predicates (i.e., from a triple) may include, inter alia, bundles, includesThirdParty, excludes, grantsUnlimitedUse, grantsLimitedUse, grantsConjunctiveUse, addsTerms, hasProduct, etc.

The following implementation example describes sample text in a license document for a company removable media manager Version 1.1 (software) allowing the software to be used with a limited-use copy of company DB workgroup server edition 9.7 as follows:

License Agreement Document

The Programs listed below are licensed under the following terms and conditions in addition to those of the international license agreement for non-warranted programs Z125-5589-05.

Program Name: Company integrated removable media manager version 1.1.
Program Number: RPQ 8B3605 supporting programs.

The Program is licensed as a multi-product package and includes the supporting programs identified below. The licensee is authorized to install and use such supporting programs only to support licensee's use of the principal program under this agreement and within the limits of the proofs of entitlement for the program (unless broader rights are provided elsewhere in this license information document). the phrase "to support licensee's use" would include only those uses that are necessary or otherwise directly related to a licensed use of the principal program or another supporting program. The supporting programs may not be used for any other purpose. The licensee is not authorized to transfer or remarket the supporting programs separate from the principal program. A supporting program may be accompanied by license terms, and those terms, if any, apply to licensee's use of that supporting program. In the event of conflict, the terms in this license information document supersede the supporting program's terms. When the licensee's right to use the program expires or terminates, the licensee must discontinue use, destroy or promptly return all copies of the supporting programs to the party from whom licensee acquired the Program. If the Licensee downloaded the supporting programs, the licensee should contact the party from whom licensee acquired the program. If the licensee wishes to license the supporting programs for any use beyond the limits set forth above, please contact a company sales representative or the party from whom the licensee acquired the program to obtain the appropriate license. The following are supporting programs licensed with the program:

Company DB workgroup server edition version 9.7
L/N: L-SSCZ-8Q8P8T
D/N: L-SSCZ-8Q8P8T
P/N: 00V7196

The aforementioned license agreement document comprises a template format and therefore known phrases are used to populate the ontology model. For example, the license agreement document comprises the phrase "The following are Supporting Programs licensed with the Program" thereby determining the predicate "grantsConjunctiveuse". Additionally, the token "L/N" is detected and the following text is captured as the license number as well as the text in the first sentence to denote that the license "addsTerms" to an existing license defined by the number "Z125-5589-05". After performing a parsing process, the following triples are created:
1. L-SSCZ-8Q8P8T hasProduct company integrated removable media manager version 1.1.

2. L-SSCZ-8Q8P8T addsTerms Z125-5589-05.
3. L-SSCZ-8Q8P8T grantsConjunctiveUse company DB workgroup server edition version 9.7.

Cross-referencing the aforementioned data with a PTI and additional licenses provides relevant facts associated with licensing, including allowed installation topologies (where must the software reside within the network deployment), general facts using inferences such as "Removable media Manager use a database server", and previously unknown configurations which are allowed by the licenses, etc.

Figure 2A:
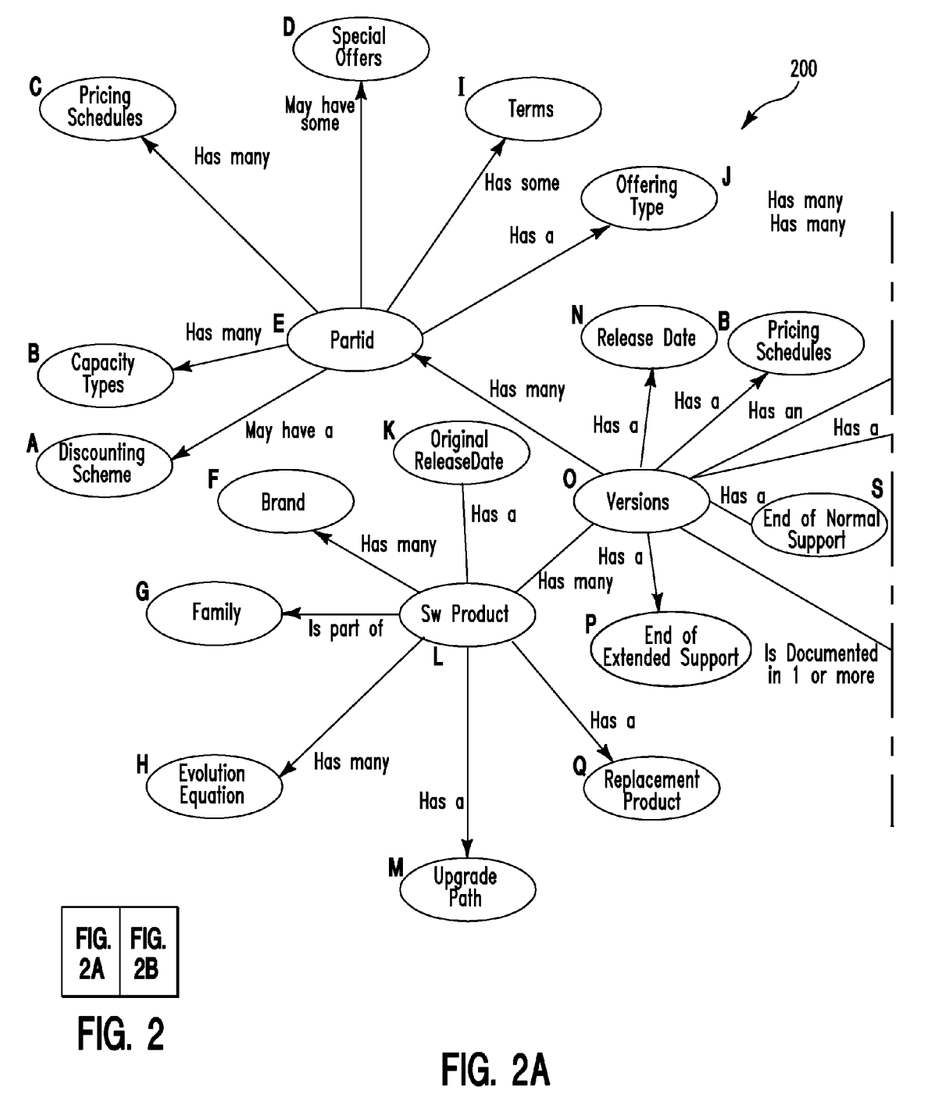
FIGS. 2A and 2B, illustrates a triple store schema generated during a natural language processing process, in accordance with embodiments of the present invention FIG. 3, including
Figure 2B:
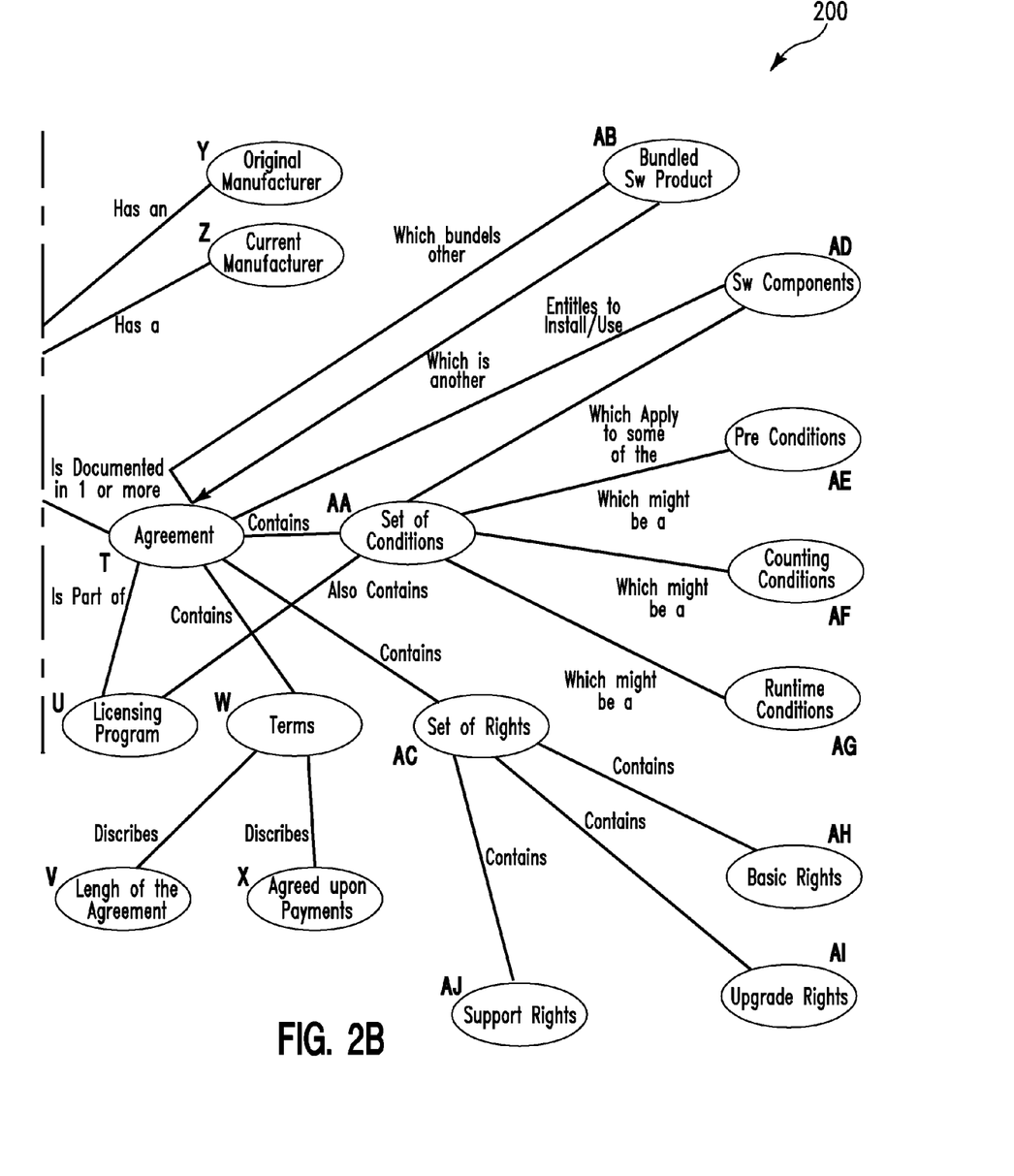

FIG. 2, including FIGS. 2A and 2B, illustrates a triple store schema 200 generated during a natural language processing process, in accordance with embodiments of the present invention. Triple store schema 200 is generated via a natural language processing evaluation of installation manuals, product announcements, license agreements, support documents, technical blogs, and marketing materials. The Triple store schema includes key information is necessary for software license management. For example, a product upgrade path is necessary to understand a continuity of the rights. Additionally, manufacturer acquisitions may result in difficulty for reconciling purchases from one manufacturer to installed components owned by another manufacturer. As a second example, capturing software bundles may help an analyst to not over license an installed component. Triple store schema 200 determines the following triples:

Triple store schema 200 determines the following triples:
L: What products have been released?
L-K: What was the product's original release date?
L-O: What product versions have been released?
O-T: What license agreements go with each product version?
T-U: What licensing programs go with each license agreement?
O-Y: What original manufacturer goes with each product version?
O-Z: What current manufacturer goes with each product version?
L-M: What product names make up the product upgrade path?
L-Q: What product names are a replacement for another product?
L-G: What family is the product in?
O-N: When a product version was released?
O-R: When a product version was no longer marketed?
O-S: When a product version's normal support ends?
O-P: When a product version's extended support ends?
O-E: What partids go with each product version?
L-F: What brand is associated with each product?
E-C: What pricing schedules goes with each partid?
E-D: What special offers go with each partid (trade up, competitive offering)?
L-G: What family goes with each product?
E-I: What terms goes with each product type for a partid?
E-J: What offering type goes with each partid (license, maint, support, reinst)?
E-B: What capacity type goes with each partid?
E-O-T: What partids go with which license agreement?
E-A: What discount scheme goes with each partid?
L-H: What evolution equation goes with a product?
T-AA: What conditions come from the agreement?
T-AD: What components are entitled by the agreement?
U-AA: What conditions come from the license program?
T-AB: What bundled products are referenced in the license agreement?
AB-T: What are the specifics of the license agreement for the bundled product?
AD-AA: What components are subject to the conditions?
T-W-V: What is the length of the agreement?
T-W-X: What are the agreed upon payments and payment schedules?
AA-AE: What are the pre conditions?
AA-AF: What are the counting conditions?
AA-AG: What are the runtime conditions?
AC-AH: What are the basic rights?
AC-AI: What are the upgrade rights?
AC-AJ: What are the support rights?

The following process enables generation of triple store schema 200:
1. Generating dictionaries by loading product taxonomy with base entities. A base entity is defined herein as classes or sets of things such as, inter alia, software, hardware, etc. A set or class may include members. For example, a member of a set "software" may include "rational software". Additionally, a member of a class may be a base entity. For example, the member "rational software" may include many members (e.g., rational software architect for software 8.5". Therefore, if an entity includes many members (and is itself not a member), it is sdefined as a base entity.
2. Enabling a parser to populate ontologies with entities located in unstructured text via use of direct matches, partial matches, and long distance matches of data from the dictionaries.
3. Enabling the parser to determine relationships between entities from the ontologies.
4. Enabling a model to validate the entities and relationships.

Figures 3, 3A:
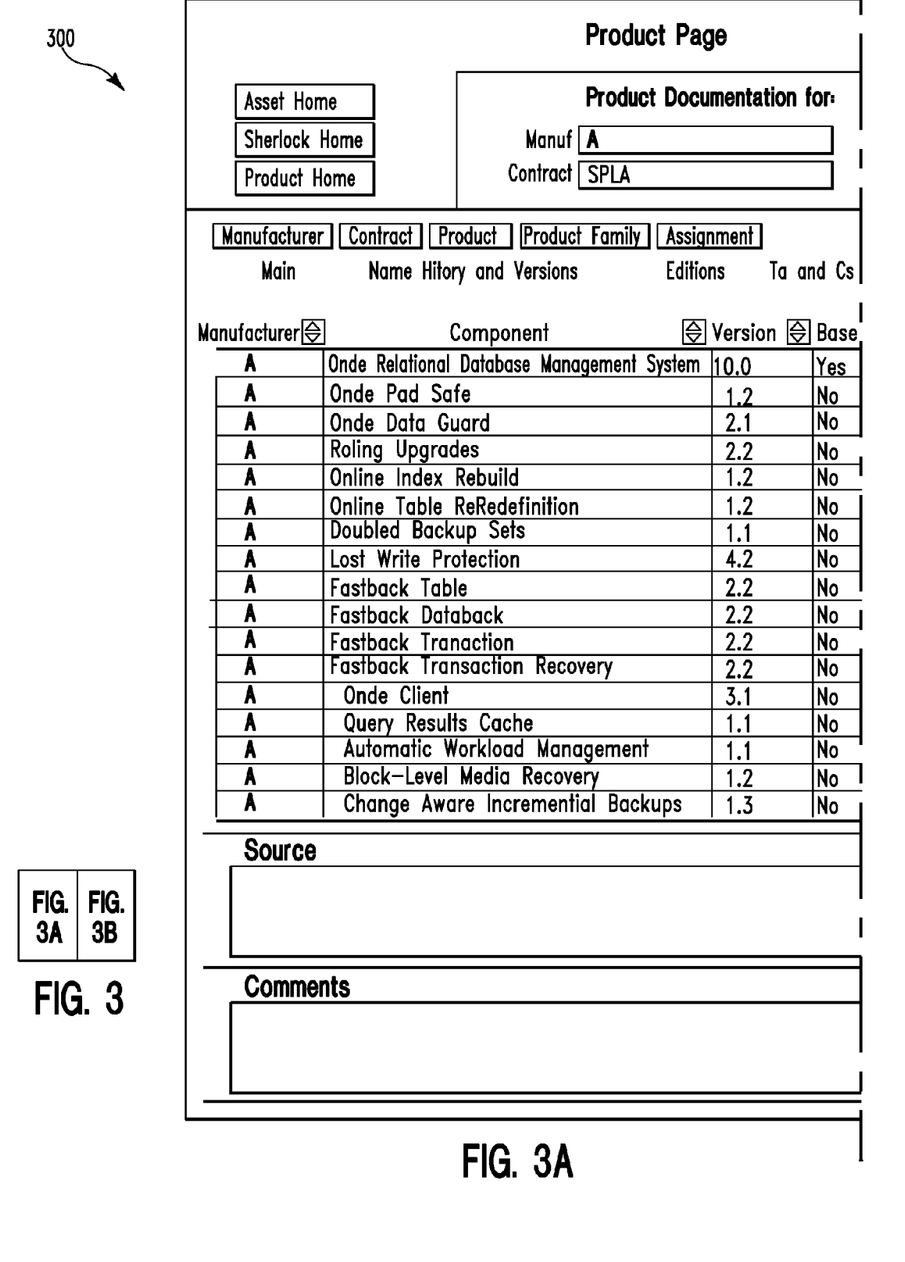
Figure 3B:
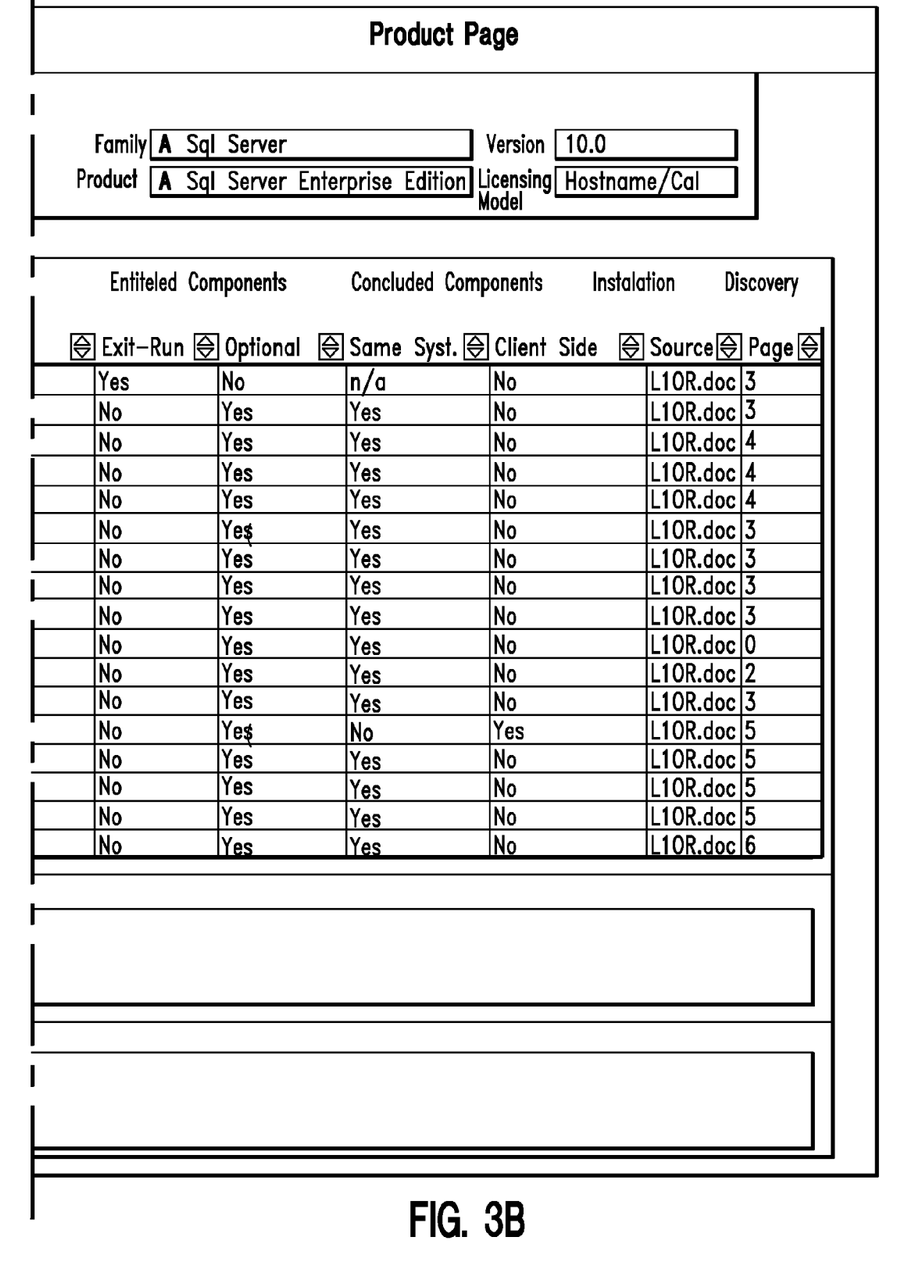

FIG. 3, including FIGS. 3A and 3B, illustrates a screen shot 300 representing the relationships in the triple store schema 200 of FIG. 2, in accordance with embodiments of the present invention. Screen shot 300 illustrates (stored) information associated with:
1. Entitled components.
2. Component versions.
3. Information associated with determining if a component is considered to be a base component.
4. Information associated with determining if a component is necessary for associated software to be functional.
5. Information associated with determining if components will be installed on a same system and a source of the information.

Figure 4:
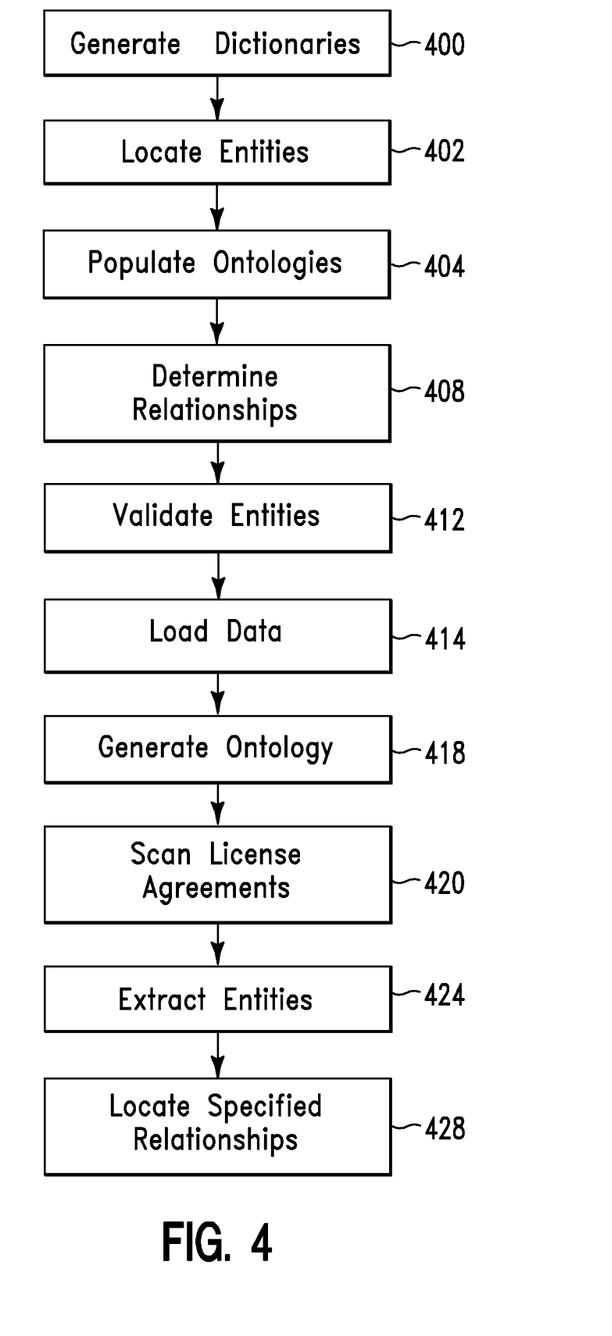
FIG. 4 illustrates an algorithm detailing a process flow enabled by the system of FIG. 1 for using natural language processing (NLP) to identify software component configuration options with respect to software installation manuals, in accordance with embodiments of the present invention.

FIG. 4 illustrates an algorithm detailing a process flow enabled by system 100 of FIG. 1 for using natural language processing (NLP) to identify software component configuration options with respect to software installation manuals, in accordance with embodiments of the present invention. Each of the steps in the algorithm of FIG. 4 may be enabled and executed in any order by a computer processor executing computer code. In step 400, program code generates dictionaries generating based on specified ontologies. Data for each dictionary is generated from a triple store conforming to a specific ontology. An ontology provides semantic context. For example, an ontology may include the following syntax:
Entry 1
ns:Product owl:Class owl:Thing;
rdfs:label "Product".
Entry 2
ns:RATIONAL_SOFTWARE_ARCHITECT
rdfs:label "Rational Software Architect";
skos:variation "RSA";
rdf:type ns:Product
Entry 3
ns:RATIONAL_SOFTWARE_ARCHITECT_8
rdfs:label "Rational Software Architect version 8";
skos:variation "RSA 8";
rdf:type ns:Product;

ns:versionOf ns:RATIONAL_SOFTWARE_ARCHITECT.
Entry 4
ns:RATIONAL_SOFTWARE_ARCHITECT_9
rdfs:label "Rational Software Architect version 9";
skos:variation "RSA 9";
rdf:type ns:Product;
ns:versionOf ns:RATIONAL_SOFTWARE_ARCHITECT.

A dictionary generated from the aforementioned ontology comprises a name of "Products.dat".

The name is generated based on entry 1 as follows:
ns:Product owl:Class owl:Thing;
rdfs:label "Product".

Contents of the dictionary comprises:
Rational Software Architect|RSA
Rational Software Architect 8|RSA 8
Rational Software Architect 9|RSA 9

Typically, there exists a 1 to 1 correspondence of an entry in a dictionary to an entry in an ontology. All values after the "|" in the above dictionary represent synonyms (or variations). The dictionary is used to search text related to entities. For example, if the text contains "RSA 9", the dictionary relates this to "Rational Software Architect 9". Likewise, the text may be used to located an exact node in the ontology using the following SPARQL query: SELECT ?node WHERE {?node rdfs:label % s}

The % s is the passed in the parameter ("Rational Software Architect 9") and the ? node variable retrieves a programmatic handle on an ontology node and therefore the algorithm may determine that RSA 9 comprises a version of "Rational Software Architect". Additionally, there may be a multiplicity of relationships available at this point. A dictionary is correlated to an ontology to enable programmatic access to the aforementioned relationships at runtime. The dictionary comprises an optimized format suitable for locating entities. The entities are identified in unstructured text and ontology models illustrate how the entities relate to other entities (e.g., in document). All annotations are produced by the NLP parser, and modeled in the ontology. For example, an ontology determines: how a book is related to a date or a language, etc. Each annotation is backed by a dictionary. The data for the dictionary is generated from a triple store conforming to the ontology. The ontology illustrates relationships of all the annotations to each other. Therefore, each entry in the dictionary comprises an entity to be located within unstructured text. When an entity is located, an associated portion of the unstructured text is annotated to denote that the entity has been located. An annotation comprises a pointer back to a dictionary entry that corresponds to an entity located in the unstructured text.

The dictionaries comprise product taxonomy and associated base entities (defined supra) associated with a plurality of software products. A dictionary may exist for each base entity. For example, a software dictionary may include (and describe) all software items of the system. Dictionaries are generated for the purpose of recognizing the base entities within text. Associated base entities are defined herein as entities that are related. For example, if a software product is installed on a hardware product, there is an association of base entities. Likewise, if a software product is associated (e.g., via a dependency) to another software product, there exists a dependency. An entire semantic chain of information may be derived from the aforementioned relationships. Furthermore, an ontology defines understanding with respect to missing data. Therefore, an ontology defines relationships that exist between annotations and further defines each annotated token in a larger context (e.g., a context of a semantic chain and semantic network). Additionally, the ontology defines missing information. In step 402, program code locates entities from unstructured text of the dictionaries. The entities may include any type of component (e.g., software component, hardware component, etc.) being searched for. The entities are located by locating direct word matches, partial word matches, and long distance word matches within the unstructured text and understanding relationship between the entities. For example, use of a semantic model to understand words within unstructured data or via use of natural language processing techniques to derive semantic models from unstructured data. In step 404, program code populates ontologies (via a parser component) with the entities. A graph model (i.e., with respect to ontologies) for implementing semantic models enables querying and maintaining deployed models. For example, if a new relationship is required to be represented, a triple store representation maintains the new relationship. A new triple is may be added to the data store. The relationships are comprised by the data and not the database structure. In step 408, program code determines relationships between the entities. The relationships may be associated with:

1. Multiple software components comprising entitlement rights for installation on a computing device.
2. A group of software components currently installed on the computing device.
3. Prerequisites required for execution of the group of software components.
4. Optionally installable components of the multiple software components.
5. Base components of the multiple software components.
6. Necessary components and unnecessary components of the multiple software components.
7. Components incompatible with the multiple software products.
8. Components associated with additional restrictions as related to the multiple software products.
9. Components considered bundled under the multiple software products.
10. Components within normal support periods of the multiple software products.
11. Components warrantees and warrantee exceptions from the multiple software products.
12. Components upgrade rights from the multiple software products.
13. Component bug/patch/fix rights from the multiple software products.
14. Components associated with functionality with respect to the multiple software products.
15. Components associated with replacements from the multiple software products.
16. Components pruned from the multiple software products.
17. Components consolidated within the multiple software products.

The relationships are determined by generating pattern matcher/parsers with respect to the unstructured data. For example, the system look for a pattern titled "x installed on y". In this case, the system locates all variations of the verb "installed on" (e.g., installs on, installation on, etc.). These located variations may be created manually and/or retrieved from any source. The pattern matcher locates the variations and the associated entity located before and after the variation. The entity comprises a delimited token. For example, entity alpha installed on beta entity. When the verb "installed on" is located, alpha is determined to be the preceding entity and beta is determined to be the succeeding entity. Therefore alpha and beta are related using the aforementioned relationship. The relationships are determined by the ontology model. In step 412, program code validates the entities and the relationships against a specified model. Entities are modeled in the ontology model comprising relationships between the entities. If the ontology model does not comprise the entities in the associated relationship, the extraction is likely to be invalid. For example, if alpha is installed on beta and both alpha and beta comprise hardware and the specified model does not comprise hardware installed on hardware, the extraction is rejected. In step 414, program code loads data of the product taxonomy into a triple store. In step 418, program code generates a specified ontology associated with the data of the product taxonomy. In step 420, program code scans license agreements associated with the plurality of software products. The scanning process is associated with the patterns that are run on unstructured data (i.e., in step 408). For example, a sample SPARQL query against a graph in W3C OWL format comprises:

SELECT ?licenseCodeAgreement WHERE {
?agreement:entitles ?swComponent; :isPartOf ?licensing-Program.
?licensingProgram contains ?setOfConditions.
}

In step 424, program code extracts a group of entities from the entities as described, supra, with respect to FIG. 1. In step 428, program code locates specified relationships of the relationships. The specified relationships are associated with entitlement rights of the plurality of software products. The specified relationships may include prerequisites required to run the plurality of software products, optional components of the plurality of software products, foundational components of the plurality of software products, necessary components required for execution of the plurality of software products, components not required for execution of the plurality of software products, etc.

Figure 5:
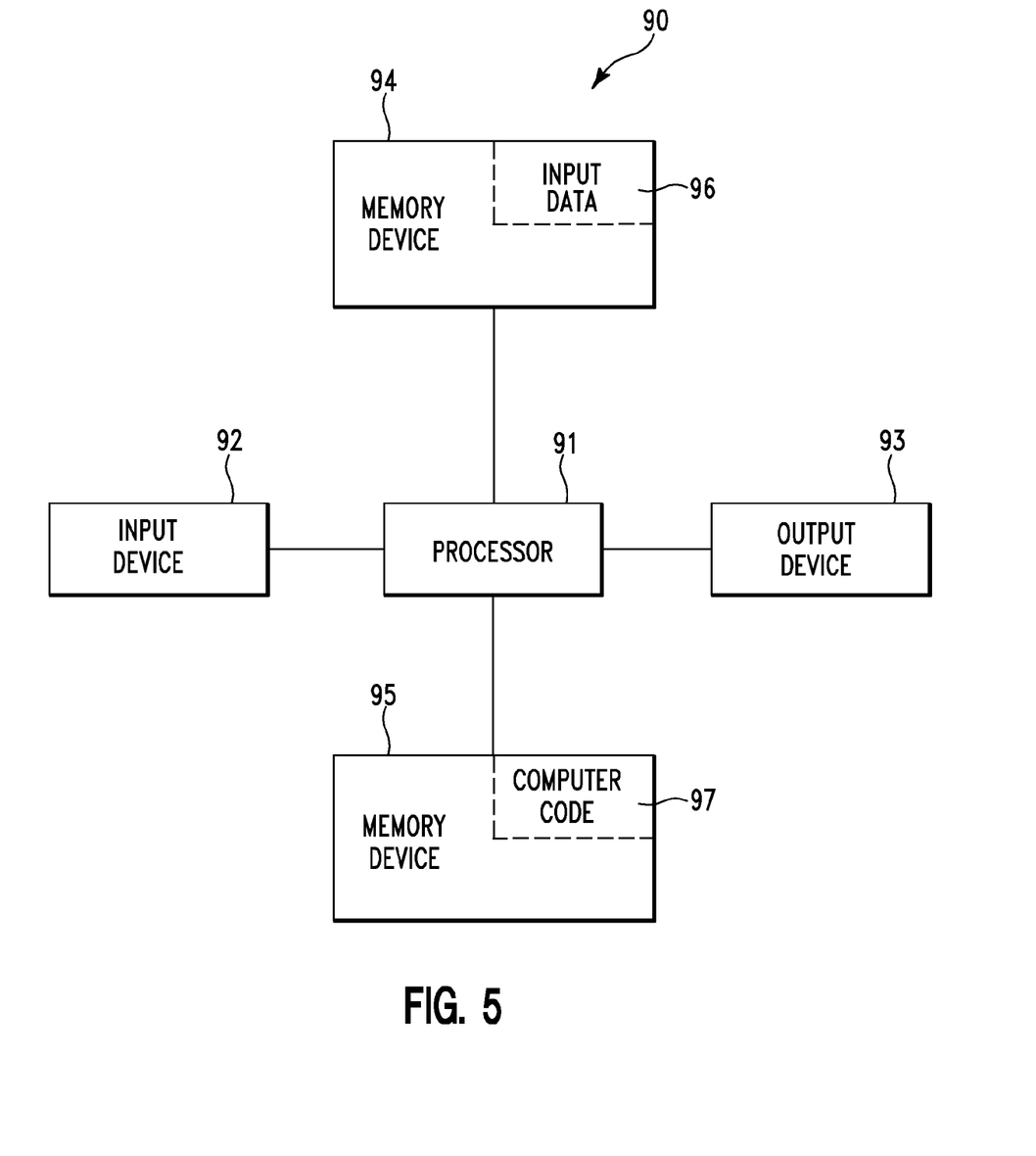
FIG. 5 illustrates a computer apparatus used by the system of FIG. 1 for using natural language processing (NLP) to identify software component configuration options with respect to software installation manuals, in accordance with embodiments of the present invention.

FIG. 5 illustrates a computer apparatus 90 for using natural language processing (NLP) to identify software component configuration options with respect to software installation manuals, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for using natural language processing (NLP) to identify software component configuration options with respect to software installation manuals. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may include the algorithm of FIG. 4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to use natural language processing (NLP) to identify software component configuration options with respect to software installation manuals. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for using natural language processing (NLP) to identify software component configuration options with respect to software installation manuals. In another embodiment, the invention provides a business method that performs the process steps of the invention on a subscription, advertising, and/or fee basis. That is, a service supplier, such as a Solution Integrator, could offer to use natural language processing (NLP) to identify software component configuration options with respect to software installation manuals. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
generating, by a computer processor of a computing system, dictionaries comprising a product taxonomy and associated base entities comprising sub-sets within a plurality of software products;
locating, by said computer processor, data entities from unstructured text of said dictionaries, wherein said locating said data entities comprises locating long distance word matches within said unstructured text;
populating, by said computer processor executing a parser component, ontologies with said data entities; and
determining, by said computer processor executing said parser component, relationships between said data entities;
scanning, by said computer processor, license agreements associated with said plurality of software products;
extracting, by said computer processor, a group of entities selected from said data entities; and
locating, by said computer processor, specified relationships of said relationships, wherein said specified relationships are associated with entitlement rights of said plurality of software products, wherein said specified relationships comprise relationships selected from the group consisting of prerequisites required to run said plurality of software products, optional components of said plurality of software products, foundational components of said plurality of software products, necessary components required for execution of said plurality of software products, and components not required for execution of said plurality of software products.

2. The method of claim 1, wherein said dictionaries comprise a direct word matching dictionary, wherein said locating said entities comprises locating direct word matches within said unstructured text, wherein a natural language processing process executed by ontology models processes said unstructured text, and wherein said method further comprises:

loading, by said computer processor, data of said product taxonomy into a triple store; and validating, by said computer processor executing a specified model, said data entities and said relationships.

3. The method of claim 2, wherein said locating said entities comprises locating partial word matches within said unstructured text resulting in product recognition in said unstructured text, and wherein said method further comprises:

generating, by said computer processor, a specified ontology associated with said data of said product taxonomy.

4. The method of claim 1, wherein said relationships are associated with multiple software components comprising entitlement rights for installation on a computing device.

5. The method of claim 1, wherein said relationships are associated with prerequisites required for execution of said multiple software components.

6. The method of claim 1, wherein said relationships are associated with optionally installable components of said multiple software components.

7. The method of claim 1, wherein said relationships are associated with base components comprising software component sub-sets within said multiple software components.

8. The method of claim 1, wherein said relationships are associated with necessary components and unnecessary components of said multiple software components.

9. The method of claim 1, further comprising:

providing at least one support service for at least one of creating, integrating, hosting, maintaining, and deploying computer-readable code in the computing system, said code being executed by the computer processor to implement said generating, said locating, said populating, and said determining.

10. A computing system comprising a computer processor coupled to a computer-readable memory unit, said memory unit comprising instructions that when executed by the computer processor implements a method comprising:

generating, by said computer processor, dictionaries comprising a product taxonomy and associated base entities comprising sub-sets within a plurality of software products;

locating, by said computer processor, data entities from unstructured text of said dictionaries, wherein said locating said data entities comprises locating long distance word matches within said unstructured text;

populating, by said computer processor executing a parser component, ontologies with said data entities; and determining, by said computer processor executing said parser component, relationships between said data entities;

scanning, by said computer processor, license agreements associated with said plurality of software products;

extracting, by said computer processor, a group of entities selected from said data entities; and locating, by said computer processor, specified relationships of said relationships, wherein said specified relationships are associated with entitlement rights of said plurality of software products, wherein said specified relationships comprise relationships selected from the group consisting of prerequisites required to run said plurality of software products, optional components of said plurality of software products, foundational components of said plurality of software products, necessary components required for execution of said plurality of software products, and components not required for execution of said plurality of software products.

11. The computing system of claim 10, wherein said dictionaries comprise a direct word matching dictionary, wherein said locating said entities comprises locating direct word matches within said unstructured text, wherein a natural language processing process executed by ontology models processes said unstructured text, and wherein said method further comprises:

loading, by said computer processor, data of said product taxonomy into a triple store; and validating, by said computer processor executing a specified model, said data entities and said relationships.

12. The computing system of claim 11, wherein said locating said entities comprises locating partial word matches within said unstructured text resulting in product recognition in said unstructured text, and wherein said method further comprises:

generating, by said computer processor, a specified ontology associated with said data of said product taxonomy.

13. The computing system of claim 10, wherein said relationships are associated with multiple software components comprising entitlement rights for installation on a computing device.

14. The computing system of claim 10, wherein said relationships are associated with prerequisites required for execution of said multiple software components.

15. The computing system of claim 10, wherein said relationships are associated with optionally installable components of said multiple software components.

16. The computing system of claim 10, wherein said relationships are associated with base components comprising software component sub-sets within said multiple software components.

17. A computer program product for software installation, the computer program product comprising:

one or more computer-readable, tangible storage devices;

program instructions, stored on at least one of the one or more storage devices, to generate dictionaries comprising a product taxonomy and associated base entities comprising sub-sets within a plurality of software products;

program instructions, stored on at least one of the one or more storage devices, to locate data entities from unstructured text of said dictionaries, wherein said locating said data entities comprises locating long distance word matches within said unstructured text;

program instructions, stored on at least one of the one or more storage devices, to populate, by a computer processor executing a parser component, ontologies with said data entities; and program instructions, stored on at least one of the one or more storage devices, to determine relationships between said data entities;

program instructions, stored on at least one of the one or more storage devices, to scan, by said computer processor, license agreements associated with said plurality of software products;

program instructions, stored on at least one of the one or more storage devices, to extract, by said computer processor, a group of entities selected from said data entities; and program instructions, stored on at least one of the one or more storage devices, to locate, by said computer processor, specified relationships of said relationships, wherein said specified relationships are associated with entitlement rights of said plurality of software products, wherein said specified relationships comprise relationships selected from the group consisting of prerequisites required to run said plurality of software products, optional components of said plurality of software products, foundational components of said plurality of software products, necessary components required for execution of said plurality of software products, and components not required for execution of said plurality of software products.

18. The computer program product of claim 17, wherein said dictionaries comprise a direct word matching dictionary, wherein said program instructions to locate said data entities comprises program instructions to locate direct word matches within said unstructured text, wherein a natural language processing process executed by ontology models processes said unstructured text, and wherein said computer program product further comprises:

program instructions, stored on at least one of the one or more storage devices, to load data of said product taxonomy into a triple store; and program instructions, stored on at least one of the one or more storage devices, to validate said data entities and said relationships.

* * * * *